United States Patent
Ichie et al.

(10) Patent No.: US 9,016,160 B2
(45) Date of Patent: Apr. 28, 2015

(54) STEERING SYSTEM AND COUPLING WIRE

(75) Inventors: Yuichi Ichie, Okazaki (JP); Yoshihide Ohara, Okazaki (JP); Kazutaka Awata, Nagoya (JP); Toru Suzuki, Seto (JP)

(73) Assignee: JTEKT Corporation, Osaka-shi (JP)

( * ) Notice: Subject to any disclaimer, the term of this patent is extended or adjusted under 35 U.S.C. 154(b) by 551 days.

(21) Appl. No.: 13/160,781

(22) Filed: Jun. 15, 2011

(65) Prior Publication Data

US 2011/0308348 A1 Dec. 22, 2011

(30) Foreign Application Priority Data

Jun. 21, 2010 (JP) ................................. 2010-140845

(51) Int. Cl.
*B62D 1/18* (2006.01)
*B62D 1/185* (2006.01)

(52) U.S. Cl.
CPC ........................................ *B62D 1/185* (2013.01)

(58) Field of Classification Search
CPC ................................ B62D 1/185; B62D 1/187
USPC ....... 74/492, 493; 174/110 R; 439/14, 15, 16; 245/9, 11; 280/775, 777
See application file for complete search history.

(56) References Cited

U.S. PATENT DOCUMENTS

| | | | | |
|---|---|---|---|---|
| 3,280,946 A * | 10/1966 | Guibeaud | | 192/92 |
| 3,678,778 A * | 7/1972 | Groves | | 74/493 |
| 3,777,051 A * | 12/1973 | Ziegler et al. | | 174/94 R |
| 5,316,506 A * | 5/1994 | Ito | | 439/879 |
| 5,651,687 A * | 7/1997 | Du-Rocher et al. | | 439/164 |
| 5,820,163 A * | 10/1998 | Thacker et al. | | 280/775 |
| 6,035,739 A * | 3/2000 | Milton | | 74/493 |
| 6,267,528 B1 * | 7/2001 | Higashino | | 403/359.5 |
| 6,517,381 B2 * | 2/2003 | Kondo | | 439/604 |
| 6,640,661 B2 * | 11/2003 | Duncan et al. | | 74/493 |
| 6,761,551 B2 * | 7/2004 | Kondo | | 425/116 |
| 6,781,059 B2 * | 8/2004 | Mizutani | | 174/75 C |
| 7,174,804 B2 * | 2/2007 | Adoline et al. | | 74/493 |
| 7,178,422 B2 * | 2/2007 | Armstrong et al. | | 74/493 |
| 7,424,835 B2 * | 9/2008 | Adoline et al. | | 74/493 |
| 7,503,234 B2 * | 3/2009 | Armstrong et al. | | 74/493 |
| 7,601,037 B2 * | 10/2009 | Telakowski et al. | | 439/879 |
| 7,635,282 B2 * | 12/2009 | Sakamoto | | 439/578 |
| 7,669,324 B2 * | 3/2010 | Daito | | 29/861 |
| 8,137,285 B1 * | 3/2012 | Regan et al. | | 600/554 |
| 2012/0279748 A1 * | 11/2012 | Martens et al. | | 174/80 |
| 2012/0285285 A1 * | 11/2012 | Tinnin | | 74/493 |

FOREIGN PATENT DOCUMENTS

| | | |
|---|---|---|
| JP | A 2000-127989 | 5/2000 |
| JP | A-2010-111299 | 5/2010 |

OTHER PUBLICATIONS

Sep. 30, 2014 Office Action issued in Chinese Patent Application No. 201110175735.4.

* cited by examiner

*Primary Examiner* — William Kelleher
*Assistant Examiner* — Zakaria Elahmadi
(74) *Attorney, Agent, or Firm* — Oliff PLC (57) ABSTRACT

A telescopic-type steering system includes an upper tube and a lower tube that are coupled to each other such that relative displacement between the upper tube and the lower tube is allowed. The steering system includes a coupling wire that is at least partially formed of an insulating member and that has one end portion and the other end portion that are electrically insulated from each other. In the steering system, the upper tube and the lower tube are coupled to each other by the coupling wire.

5 Claims, 7 Drawing Sheets

STEERING SYSTEM AND COUPLING WIRE

INCORPORATION BY REFERENCE

The disclosure of Japanese Patent Application No. 2010-140845 filed on Jun. 21, 2010 including the specification, drawings and abstract is incorporated herein by reference in its entirety.

BACKGROUND OF THE INVENTION

1. Field of the Invention

The invention relates to a steering system and a coupling wire that is used for the steering system.

2. Description of Related Art

As a vehicle steering system, there is known a telescopic-type steering system that adjusts the position of a steering wheel in the vehicle longitudinal direction by extending or contracting a steering column based on the body size and the driving posture of a driver. In a telescopic-type steering system, generally, a steering column is formed by joining an upper tube with a lower tube and a telescopic steering shaft is housed in the steering column. For example, Japanese Patent Application Publication No. 2010-111299 (JP 2010-111299 A) describes a conventional telescopic-type steering system.

To install a telescopic-type steering system in a vehicle, first, a steering column is assembled from an upper tube and a lower tube, and then the steering column is installed in the vehicle. At this time, the relative displacement between the upper tube and the lower tube along the axial direction of a steering shaft may be caused. Therefore, the relative positions of the upper tube and the tower tube may be greatly changed during the installation work, which reduces the work efficiency. In recent years, the weight of steering columns has been increasing, which further increases the difficulty in the work of installing a steering column in a vehicle. Therefore, techniques for improving the efficiency of the work of installing a steering column in a vehicle have been expected.

In order to improve the efficiency of the installation work, there may be employed, for example, a technique in which an upper tube and a lower tube are coupled to each other by a metal wire and, in this state, a steering column is installed in a vehicle. According to the technique, it is possible to more easily perform the work of installing the steering column in the vehicle because the wire restricts the relative displacement between the upper tube and the lower tube. However, if the wire is kept unremoved even after the steering column is installed in the vehicle, electricity may be passed through the wire. In, for example, a steering system of an electric power steering type, components such as an electric motor and a control circuit are installed on a lower tube and therefore electricity that is supplied from a battery to the lower tube may be passed through a wire. If electricity is passed through the wire, the temperature of the wire becomes high, which may exert adverse effects on nearby components.

SUMMARY OF THE INVENTION

It is an object of the invention to provide a technique that makes it possible to restrict the relative displacement between an upper tube and a lower tube without exerting adverse effects on nearby components in a telescopic-type steering system.

A steering system according to an aspect of the invention is a telescopic-type steering system which includes an upper tube and a lower tube wad in which the relative displacement between the upper tube and the lower tube is allowed. The steering system includes a coupling wire that is at least partially formed of an insulating member, and that has one end portion and the other end portion that are electrically insulated from each other. In the steering system, the upper tube and the lower tube are coupled to each other by the coupling wire.

In the steering system described above, one end portion and the other end portion of the coupling wire that couples the upper tube to the lower tube are electrically insulated from each other. Therefore, electricity is not passed through the coupling wire. Accordingly, it is possible to prevent occurrence of the situation where the temperature of the coupling wire becomes high due to passage of electricity and thus adverse effects are exerted on nearby components.

In the steering system described above, the coupling wire may include: a metal wire; a metal block that is formed integrally with one end of the metal wire; a resin collar that covers an outer periphery of the metal block; and a metal terminal that is swaged to be connected to the resin collar so as to cover the resin collar.

In the steering system described above, the resin collar is interposed between the metal block and the metal terminal. Therefore, the metal terminal holds the metal block without directly contacting the metal block. That is, the metal block is electrically insulated from the metal terminal, and the metal wire that is formed integrally with the metal block is also electrically insulated from the metal terminal. With the steering system described above, it is possible to reliably prevent passage of electricity through the coupling wire although the simply structured coupling wire that is easy to produce is used.

In the steering system described above, a rib may be formed at a portion of the metal block, which is not covered with the resin collar, a rib may be formed at a portion of the resin collar, which is in contact with the rib of the metal block, and the rib of the resin collar may be held between the rib of the metal block and a swaged portion of the metal terminal so as to be in close contact with the rib of the metal block and the swaged portion.

In the coupling wire, when a tension is applied to the metal wire, the tension is transmitted to the metal terminal via the rib of the metal block, the rib of the resin collar and the swaged portion of the metal terminal. At this lime, the load that is applied to the resin collar is mainly a compressive load that is applied to the rib. A tensile load and a shearing load are hardly applied to the resin collar. Accordingly, it is possible to form the coupling wire having high durability without unnecessarily increasing the plate thickness of the resin collar.

Another aspect of the invention relates to a coupling wire. In a telescopic-type steering system which includes an upper tube and a lower tube and in which the relative displacement between the upper tube and the lower tube is allowed, the coupling wire is used to couple the upper tube to the lower tube. The coupling wire is at least partially formed of an insulating member. One end portion and the other end portion of the coupling wire are electrically insulated from each other.

With the telescopic-type steering system and the coupling wire described above, it is possible to restrict the relative displacement between the upper tube and the lower tube without exerting adverse effects on nearby components.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
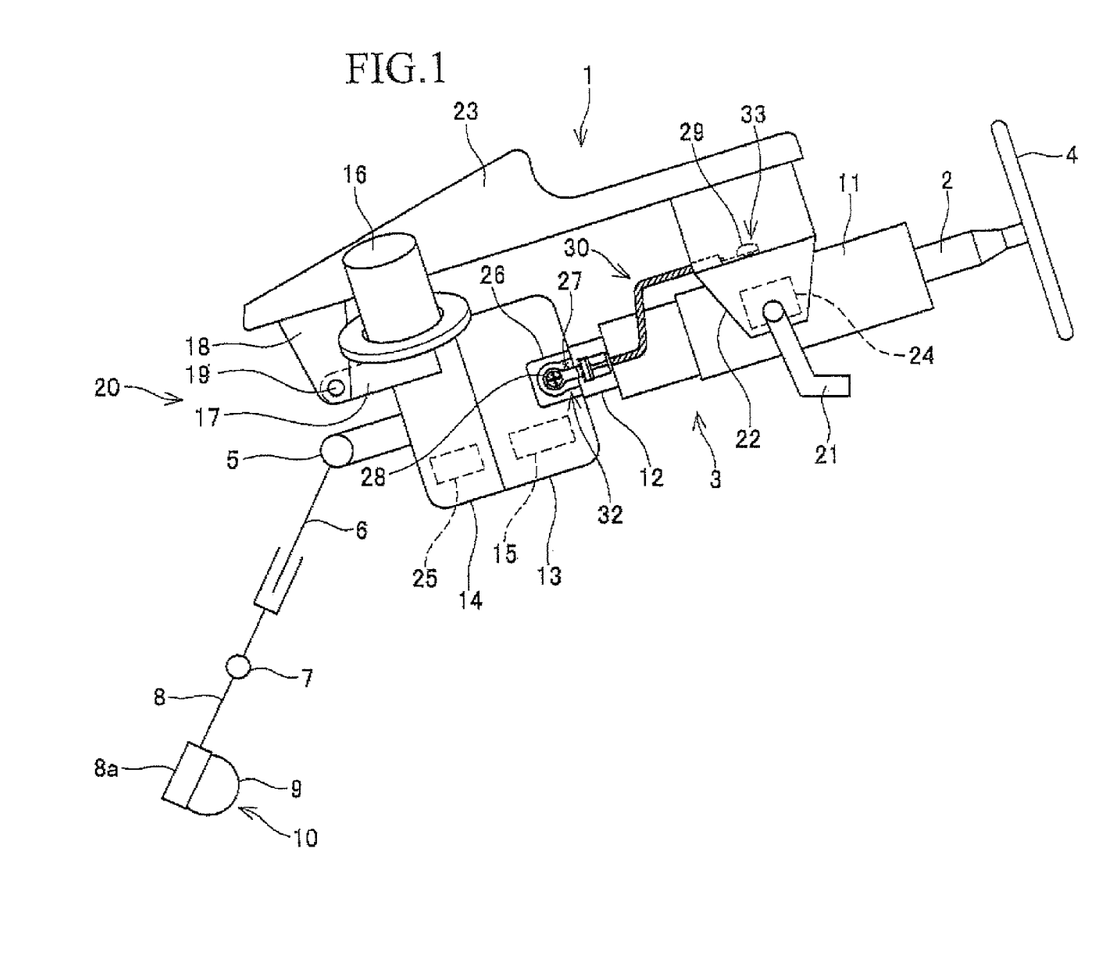
FIG. 1 is a view schematically showing the structure of a steering system according to an embodiment of the invention.

Hereafter, an embodiment of the invention will be described with reference to the accompanying drawings. FIG. 1 is a side view of a steering system 1 according to the embodiment of the invention. The steering system 1 according to the embodiment is configured as an electric power steering system. The steering system 1 includes a steering shaft 2 and a tubular steering column 3 that houses and rotatably supports the steering shaft 2.

The steering shaft 2 is formed so as to be telescopic in the axial direction thereof, by spline-connecting an upper shaft to a lower shaft. A steering wheel 4 is coupled to an upper end of the steering shaft 2. An intermediate shaft 6 is coupled to a lower end of the steering shaft 2 via a universal joint 5 so as to operate in conjunction with the steering shaft 2. A pinion shaft 8 is coupled to a lower end of the intermediate shaft 6 via a universal joint 7 so as to operate in conjunction with the intermediate shaft 6. A steering mechanism 10 is a rack-and-pinion mechanism including a pinion 8a formed in the pinion shaft 8 and a rack shaft 9 that meshes with the pinion 8a. Although not shown in the drawings, end portions of the rack shaft 9 in the lateral direction of the vehicle (direction perpendicular to the sheet on which FIG. 1 is drawn) are coupled to corresponding steered wheels via tie-rods and knuckle arms.

The steering column 3 includes an upper tube 11, a lower tube 12, a sensor housing 13, and a gear housing 14. The lower tube 12 is coupled to a lower end portion of the upper tube 11. The sensor housing 13 is fixed to a lower end portion of the lower tube 12. The gear housing 14 is fixed to a lower end portion of the sensor housing 13. An upper end portion of the lower tube 12 is fitted into the lower end portion of the upper tube 11 so as to be slidable along the axial direction. Therefore, the steering column 3 is telescopic along the axial direction in accordance with a telescopic motion of the steering shaft 2. In this way, the position of the steering wheel 4 in the vehicle longitudinal direction is adjusted. A torque sensor 15 used to detect a steering torque is housed in the sensor housing 13, at a position near the steering shaft 2. An electric motor 16 and a control unit 25 are fitted to the gear housing 14. The electric motor 16 supplies a steering assist force to the steering shaft 2. The control unit 25 controls the operation of the electric motor 16.

Although not shown in the drawings, a speed reduction mechanism is housed in the gear housing 14. The speed reduction mechanism includes a drive gear and a driven gear. The drive gear is coupled to an output shaft of the electric motor 16. The driven gear is meshed with the drive gear and coaxially coupled to the steering shaft 2. When the steering wheel 4 is steered by a driver, the control unit 25 that operates in conjunction with a vehicle body-side ECU (Electronic Control Unit) drives the electric motor 16 at a predetermine voltage based on a value detected by the torque sensor 15 and a detected vehicle speed. Then, a driving force from the electric motor 16 is transmitted to the steering shaft 2 via the speed reduction mechanism housed in the gear housing 14. Thus, a steering assistance is provided to the steering operation performed by the driver.

A lower end portion of the steering column 3 is supported by a hinge mechanism 20, which includes a pivot shaft 19, so as to be pivotable in the up-down direction. More specifically, the pivot shaft 19 is provided, in a column bracket having a pair of right and left projections 17 formed at the gear housing 14, and the pivot shaft 19 is supported by a support bracket 18. Therefore, the entirety of the steering column 3 is pivotable about the pivot shaft 19 along with the steering wheel 4. In this way, the position of the steering wheel 4 in the vehicle-height direction is adjusted.

A support housing 22 is fixed to the upper tube 11 of the steering column 3. The support housing 22 houses a lock mechanism 24 that allows or prohibits a telescopic motion and a pivot motion of the steering column 3 in response to an operation of an operation lever 21. The driver places the operation lever 21 in an unlock state, adjusts the position of the steering wheel 4 to a desired position, and then place's the operation lever 21 in a lock state. In this way, the driver is able to adjust the position of the steering wheel 4 in the vehicle longitudinal direction and in the vehicle-height direction.

The support bracket 18 and the support housing 22 are both fixed to a main bracket 23 that is a vehicle body-side member.

The sensor housing 13 and the support housing 22 are coupled to each other by a coupling wire 30. A lower end portion 32 of the coupling wire 30 is coupled to a wire coupling portion 27, formed on an outer peripheral face of the sensor housing 13, with a screw 28. A rotation stopper 26 that restricts the rotation of the coupling wire 30 relative to the sensor housing 13 is formed around the wire coupling portion 27. An upper end portion 33 of the coupling wire 30 is coupled to a wire coupling portion 29, formed on an upper face of the support housing 22, with a screw. As shown in FIG. 1, the position, at which the lower end portion 32 of the coupling wire 30 is fitted to the sensor housing 13, and the position, at which the upper end portion 33 of the coupling wire 30 is fitted to the support housing 22, are offset from each other by 90 degrees around the axis of the steering column 3.

Figure 2:
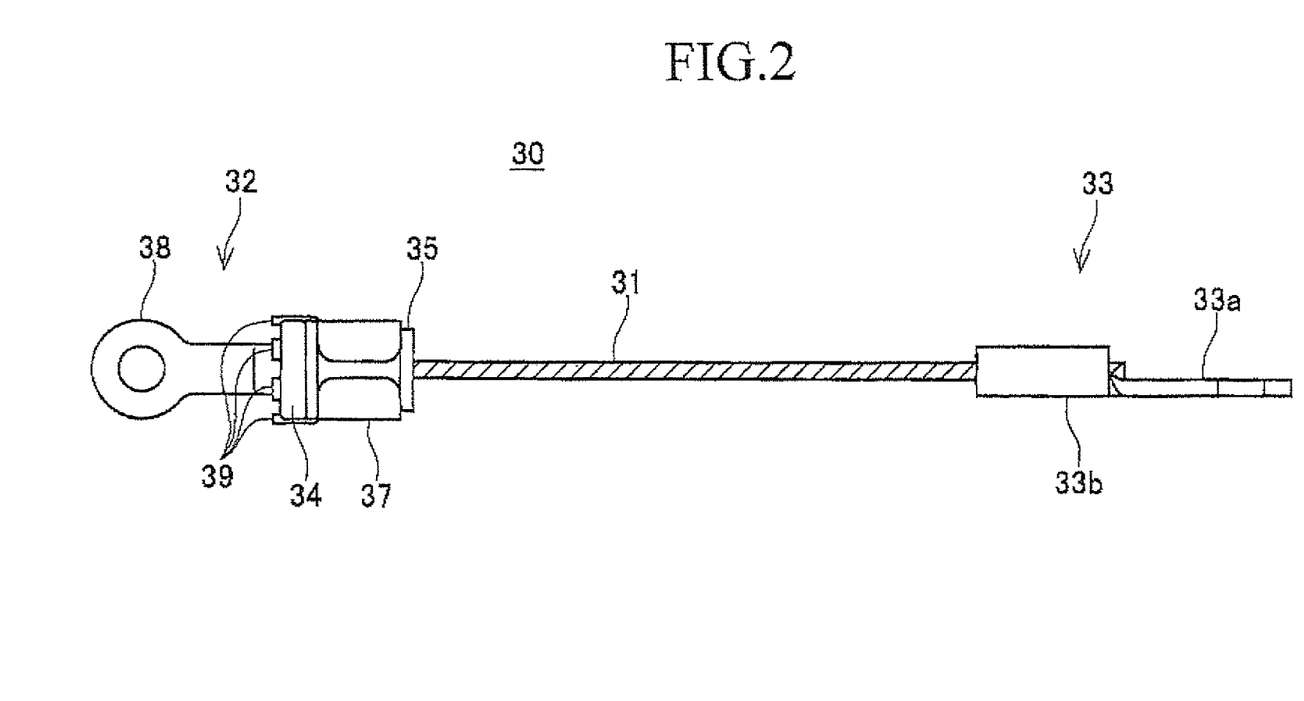
FIG. 2 is a view showing the overall structure of a coupling wire according to the embodiment.

FIG. 2 shows the overall structure of the coupling wire 30. The coupling wire 30 is formed of a metal wire 31, the lower end portion 32, and the upper end portion 33. The metal wire 31 is a hard steel wire. The lower end portion 32 is coupled to the sensor housing 13. The upper end portion 33 is coupled to the support housing 22. A metal terminal 33b is formed at the upper end portion 33. The metal terminal 33b has a metal washer 33a that is fitted to the support housing 22 with the screw.

Figure 3:
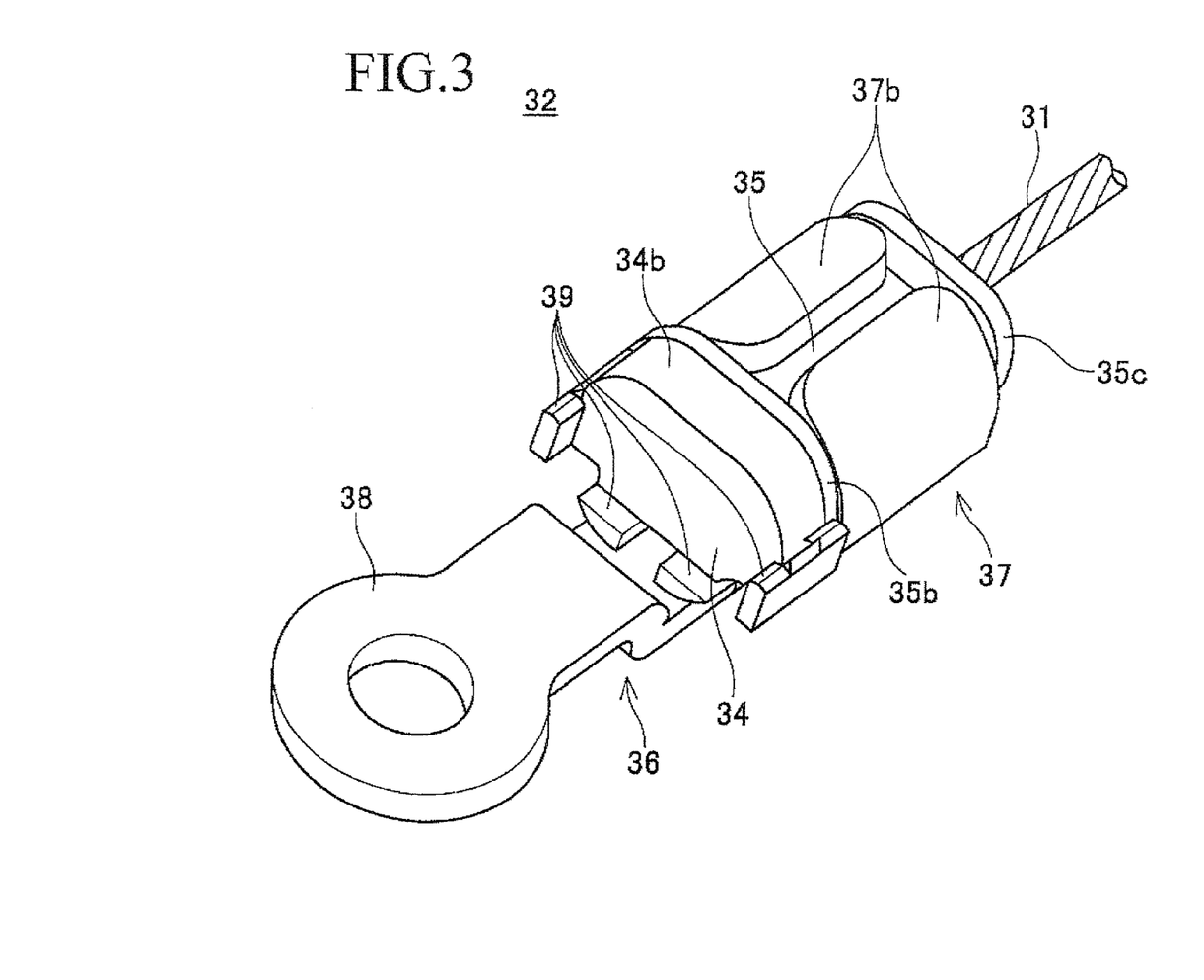
FIG. 3 is a perspective view showing the appearance of a lower end portion of the coupling wire according to the embodiment.
Figure 4:
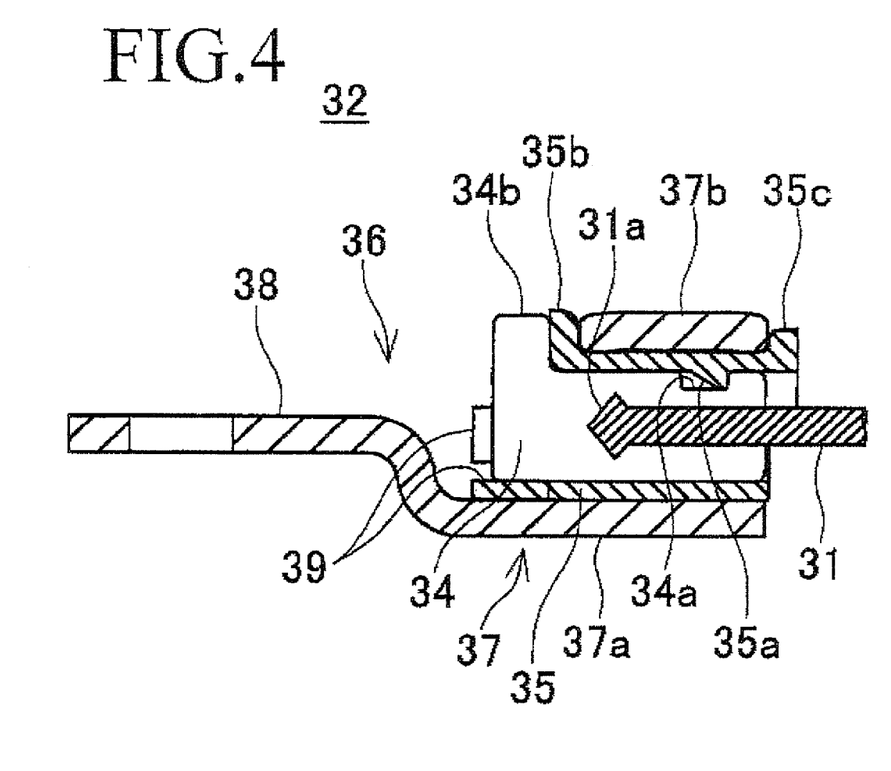
FIG. 4 is a longitudinal sectional view showing the inner structure of the lower end portion of the coupling wire according to the embodiment.

FIGS. 3 and 4 illustrate the lower end portion 32 of the coupling wire 30 in detail. The lower end portion 32 includes a metal block 34, a resin collar 35, and a metal terminal 36.

The metal block 34 is a zinc die-cast block member that is formed in a substantially columnar shape. As shown in FIG. 4, the metal block 34 is formed integrally with a front end portion 31a of the metal wire 31 through insert molding. A rib 34b that projects upward is formed at a front end portion of the metal block 34. The front end portion is on one side of the metal block 34, and a portion from which the metal wire 31 extends is on the opposite side of the metal block 34.

The resin collar 35 is formed in such a shape as to cover the outer periphery of the metal block 34. The resin collar 35 has a slit on the lower face side. The resin collar 35 is elastically deformed such that the width of the slit is increased and the metal block 34 is then housed in the resin collar 35. In this way, the resin collar 35 is fitted to the metal block 34. When the resin collar 35 is fitted to the metal block 34, an engagement lug 35a formed on the resin collar 35 is engaged with an engagement hole 34a formed in the metal block 34, as shown in FIG. 4. As a result, the resin collar 35 is prevented from being displaced toward the metal wire 31-side and being removed from the metal block 34. A front end rib 35b and a rear end rib 35c that project upward are formed at a front end portion and a rear end portion of the resin collar 35, respectively. The front end portion is on one side of the resin collar 35, and the rear end portion is on the opposite side of the resin collar 35 on which the metal wire 31 is provided. The rib 34b of the metal block 34 is formed at a portion that is not covered with the resin collar 35 when the resin collar 35 is fitted to the metal block 34. The front end rib 35b of the resin collar 35 is formed at a portion that contacts the rib 34b of the metal block 34 when the resin collar 35 is fitted to the metal block 34.

The metal terminal 36 has a swaged portion 37 that is swaged to be connected to the resin collar 35, and a washer portion 38 that is fitted to the sensor housing 13 with the screw. The swaged portion 37 has a bottom plate 37a, and side plates 37b that extend on both sides from the bottom plate 37a. The resin collar 35 is placed on the bottom plate 37a, and then the side plates 37b are swaged such that the resin collar 35 is covered with the side plates 37a from both sides. In this way, the metal terminal 36 is fitted to the resin collar 35. When the metal terminal 36 is fitted to the resin collar 35, the front end rib 35b of the resin collar 35 is held between and in close contact with the rib 34b of the metal block 34 and the side plates 37b of the swaged portion 37, and the rear end rib 35c of the resin collar 35 is in contact with the side plates 37b of the swaged portion 37. The metal terminal 36 has been subjected to a surface treatment for suppressing dew condensation. Therefore, corrosion due to water absorbed into the resin collar 35 and electric corrosion of the metal terminal 36 are prevented.

When a tension is applied to the metal wire 31, the tension is transmitted to the washer portion 38 of the metal terminal 36 via the rib 34b of the metal block 34, the front end rib 35b of the resin collar 35 and the side plates 37b of the swaged portion 37 of the metal terminal 36. At this time, the load that is applied to the resin collar 35 is mainly a compressive load that is applied to the front end rib 35b. A tensile load and a shearing load are hardly applied to the resin collar 35. Accordingly, it is possible to form the lower end portion 32 having high durability without unnecessarily increasing the plate thickness of the resin collar 35.

At the lower end portion 32 of the coupling wire 30, the direction in which the swaged portion 37 of the metal terminal 36 is swaged is perpendicular to the direction in which a tension is applied to the metal wire 31. With this structure, even if a high tension is applied to the metal wire 31, the swaged portion 37 of the metal terminal 36 does riot open. It is possible to form the lower end portion 32 having high durability.

Figure 6A:
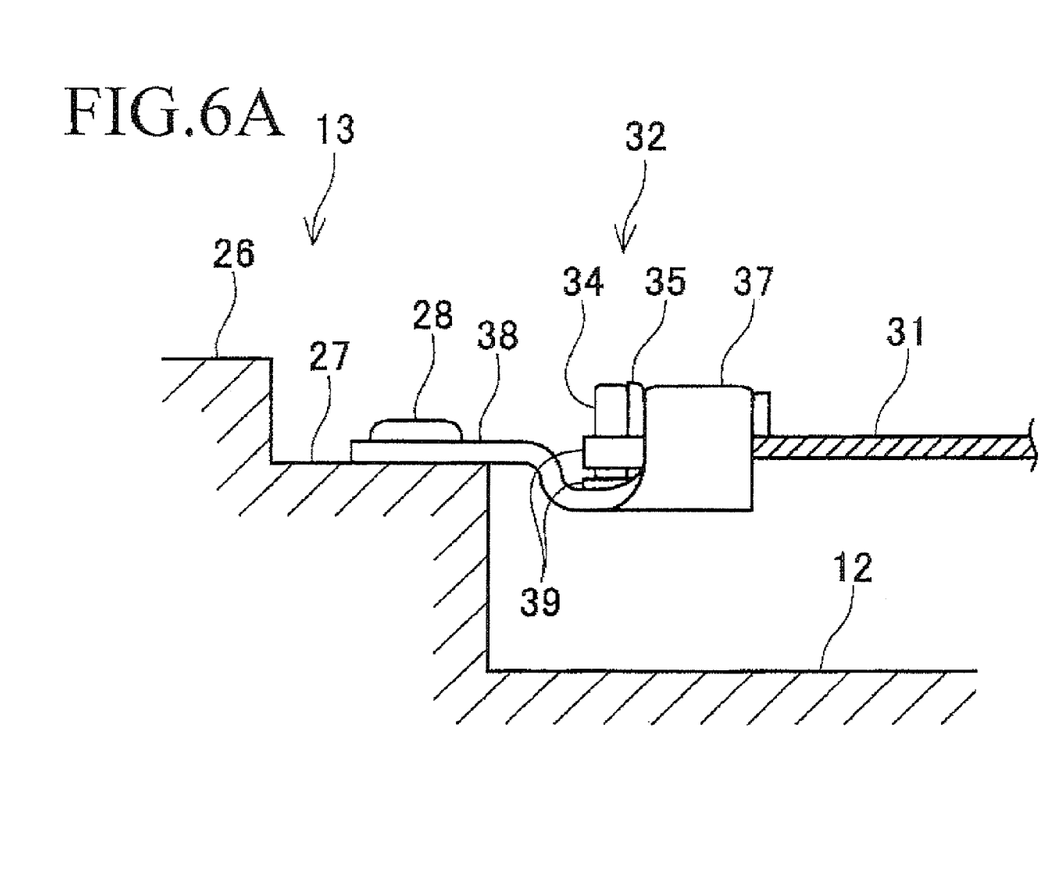
FIG. 6A is a view schematically showing the state where the lower end portion of the coupling wire according to the embodiment is fitted to the sensor housing so as to face upward.
Figure 6B:
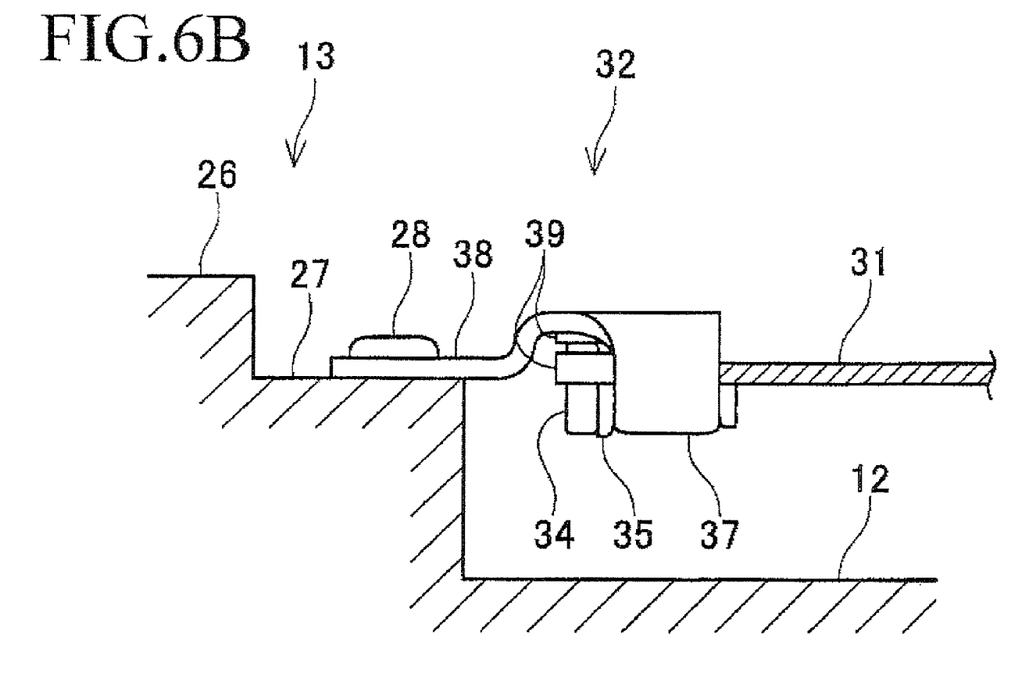
FIG. 6B is a view schematically showing the state where the lower end portion of the coupling wire according to the embodiment is fitted to the sensor housing so as to face downward.

As shown in FIG. 4, the metal terminal 36 has such a shape that a seating face of the washer portion 38 is offset from the bottom plate 37a of the swaged portion 37 and the axis of the metal wire 31 is located within a range of the plate Thickness of the washer portion 38. Therefore, even if a tension is applied to the metal wire 31, a large bending moment is not applied to the lower end portion 32. Further, regardless of whether the lower end portion 32 is fitted to the sensor housing 13 so as to face upward as shown in. FIG. 6A or so as to face downward as shown in FIG. 6B, the lower end portion 32 does not contact the lower tube 12. It is possible to improve the efficiency of the work for fitting the lower end portion 32 to the sensor housing 13.

At the lower end portion 32 of the coupling wire 30, the resin collar 35 is interposed between the metal block 34 and the metal terminal 36, and therefore the metal terminal 36 holds the metal block 34 without directly contacting the metal block 34. That is, the metal block 34 is electrically insulated from the metal terminal 36, and the metal wire 31 of which the front end is inserted in the metal block 34 is electrically insulated from the metal terminal 36. Accordingly, even if the coupling wire 30 is provided between and coupled to the sensor housing 13 and the support housing 22, the sensor housing 13 and the metal wire 31 are electrically insulated from each other, and the sensor housing 13 and the support housing 22 are also electrically insulated from each other.

Figure 5:
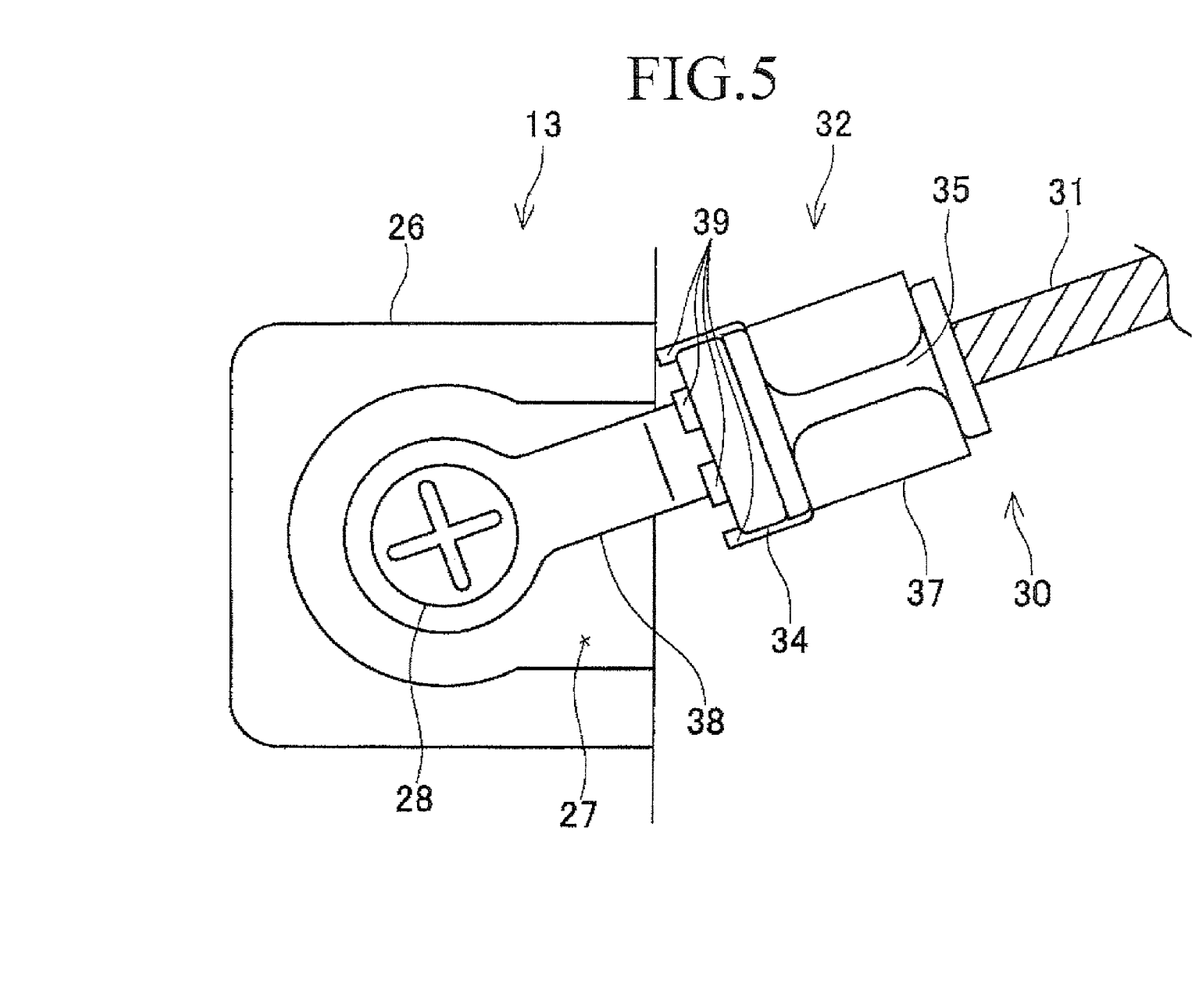
FIG. 5 is a view schematically showing the state where the coupling wire according to the embodiment is rotated relative to a sensor housing.

As shown in FIGS. 2 and 3, a plurality of resin stoppers 39 are formed at the front end portion of the resin collar 35. As shown in FIG. 5, even if the coupling wire 30 is rotated relative to the sensor housing 13 with the lower end portion 32 fitted to the wire coupling portion 27, not the metal block 34 and the metal wire 31 but the resin stopper 39 contacts the rotation stopper 26. Accordingly, even if the coupling wire 30 rotates relative to the sensor housing 13 and the rotation of the coupling wire 30 is restricted by the rotation stopper 26, electric insulation between the sensor housing 13 and the metal wire 31 is maintained. In addition, the resin stoppers 39 are formed only at the front end portion of the resin collar 35 and not formed at the rear end portion of the resin collar 35. Therefore, during the work of fitting the resin collar 35 to the metal block 34, a worker is unlikely to make a mistake in the fitting direction and therefore reverse fitting is prevented.

While the invention has been described in detail with reference to an embodiment thereof, it is to be understood that the embodiment is merely an example and does not limit the scopes of claims. The scopes of the claims include techniques achieved by making various modifications or changes to the embodiment described above.

Each technical component described in the specification or illustrated in the drawings provides technical utility by itself or in combination with the other technical components described in the specification or illustrated in the drawings. The combination of the technical components is not limited to the one described in the claims at the time of filing of the subject application. The technique described in the specification or illustrated in the drawings achieves a plurality of technical objects at the same time, and provides technical utility by achieving one of the technical objects.

What is claimed is:

1. A telescopic-type steering system, comprising:
   an upper tube;
   a lower tube; and a coupling wire that is at least partially formed of an insulating member, and that has one end portion and an other end portion that are electrically insulated from each other, wherein the coupling wire includes:
  a metal wire;
  a metal block that is fanned integrally with one end of the metal wire;
  a resin collar that covers an outer periphery of the metal block; and
  a metal terminal that is swaged to be connected to the resin collar so as to cover the resin collar,
wherein relative displacement between the upper tube and the lower tube is allowed,
wherein the upper tube and the lower tube are coupled to each other by the coupling wire,
wherein a rib is formed at a portion of the metal block, which is not covered with the resin collar,
wherein a rib is formed at a portion of the resin collar, which is in contact with the rib of the metal block; and
wherein the rib of the resin collar is held between the rib of the metal block and a swagged portion of the metal terminal so as to be in close contact with the rib of the metal block and the swagged portion.

2. The telescopic-type steering system according to claim 1, further comprising:
  an electrical component,
  wherein the electrical component is fitted to at least one of an upper tube-side member and a lower tube-side member.

3. A coupling wire, comprising:
an insulating member,
wherein, one end portion and the other end portion of the coupling wire are electrically insulated from each other, and
wherein the coupling wire couples an upper tube and a lower tube to each other in a telescopic-type steering system which includes the upper tube and the lower tube and in which relative displacement between the upper tube and the lower tube is allowed, wherein the coupling wire includes:
  a metal wire;
  a metal block that is fanned integrally with one end of the metal wire;
  a resin collar that covers an outer periphery of the metal block; and
  a metal terminal that is swaged to be connected to the resin collar so as to cover the resin collar,
wherein a rib is formed at a portion of the metal block, which is not covered with the resin collar,
wherein a rib is formed at a portion of the resin collar, which is in contact with the rib of the metal block; and
wherein the rib of the resin collar is held between the rib of the metal block and a swagged portion of the metal terminal so as to be in close contact with the rib of the metal block and the swagged portion.

4. The telescopic-type steering system according to claim 1, the rib of the metal block is integrally formed as a unitary structure with the metal block.

5. The telescopic-type steering system according to claim 1, wherein the rib of the resin collar is integrally formed as a unitary structure with the resin collar.

* * * * *